United States Patent
Cortial et al.

(10) Patent No.: US 9,869,593 B2
(45) Date of Patent: Jan. 16, 2018

(54) DETECTION DEVICE WITH SUSPENDED BOLOMETRIC MEMBRANES HAVING A HIGH ABSORPTION EFFICIENCY AND SIGNAL-TO-NOISE RATIO

(71) Applicant: ULIS, Veurey Voroize (FR)

(72) Inventors: Sébastien Cortial, Sassenage (FR); Michel Vilain, Saint Georges de Commiers (FR)

(73) Assignee: ULIS, Veurey Voroize (FR)

( * ) Notice: Subject to any disclaimer, the term of this patent is extended or adjusted under 35 U.S.C. 154(b) by 0 days.

(21) Appl. No.: 15/355,835

(22) Filed: Nov. 18, 2016

(65) Prior Publication Data
US 2017/0167922 A1    Jun. 15, 2017

(30) Foreign Application Priority Data
Dec. 15, 2015 (FR) ...................... 15 62347

(51) Int. Cl.
*G01J 5/02* (2006.01)
*G01J 5/10* (2006.01)
(Continued)

(52) U.S. Cl.
CPC .................. *G01J 5/10* (2013.01); *G01J 5/024* (2013.01); *G01J 5/045* (2013.01); *G01J 5/20* (2013.01); *G01J 2005/103* (2013.01)

(58) Field of Classification Search
CPC . G01J 5/20; G01J 5/024; G01J 5/0853; G03F 7/20
See application file for complete search history.

(56) References Cited

U.S. PATENT DOCUMENTS

| 5,288,649 A | 2/1994 | Keenan |
| 5,912,464 A | 6/1999 | Vilain et al. |

(Continued)

FOREIGN PATENT DOCUMENTS

| EP | 2894444 A1 | 7/2015 |
| EP | 2908109 A1 | 8/2015 |
| JP | 2000346704 A | 12/2000 |

OTHER PUBLICATIONS

French Search Report issued in French Patent Application No. 1562347 dated Aug. 24, 2016.
(Continued)

*Primary Examiner* — Kenneth J Malkowski
(74) *Attorney, Agent, or Firm* — Marshall, Gerstein & Borun LLP

(57) ABSTRACT

A bolometric detection device includes a substrate having a read-out circuit. The device also includes an array of elementary detectors each including a membrane suspended above the substrate and connected to the read-out circuit by at least two electric conductors. The membrane has two electrically-conductive electrodes respectively connected to the two electric conductors, and a volume of transducer material electrically connecting the two electrodes. The read-out circuit is configured to apply an electrical stimulus between the two electrodes of the membrane and to form an electric signal as a response to said application. The volume includes a volume of a first transducer material electrically connecting the two electrodes of the membrane and forming walls of a closed enclosure having each of the electrodes at least partially housed therein; and a volume of a second transducer material, electrically connecting the two electrodes and housed in the enclosure, the electric resistivity of the second material being smaller than the electric resistivity (Continued)

of the first material; and the two transducer materials having a negative thermal coefficient of resistivity TCR.

14 Claims, 7 Drawing Sheets

(51) Int. Cl.
*G01J 5/04* (2006.01)
*G01J 5/20* (2006.01)

(56) References Cited

U.S. PATENT DOCUMENTS

| | | | | |
|---|---|---|---|---|
| 2006/0060784 A1* | 3/2006 | Moon | ..................... | G01J 5/10 250/338.1 |
| 2008/0251723 A1* | 10/2008 | Ward | ..................... | G01J 5/02 250/338.4 |
| 2009/0140148 A1* | 6/2009 | Yang | ..................... | G01J 5/20 250/338.4 |
| 2014/0319350 A1 | 10/2014 | Yon et al. | | |

OTHER PUBLICATIONS

Mottin et al., "Uncooled amorphous silicon technology enhancement for 25μm pixel pitch achievement," *Proceedings of SPIE*, vol. 4820 pp. 200-207 (2003).

* cited by examiner (State of the art)

(State of the art)

(State of the art)

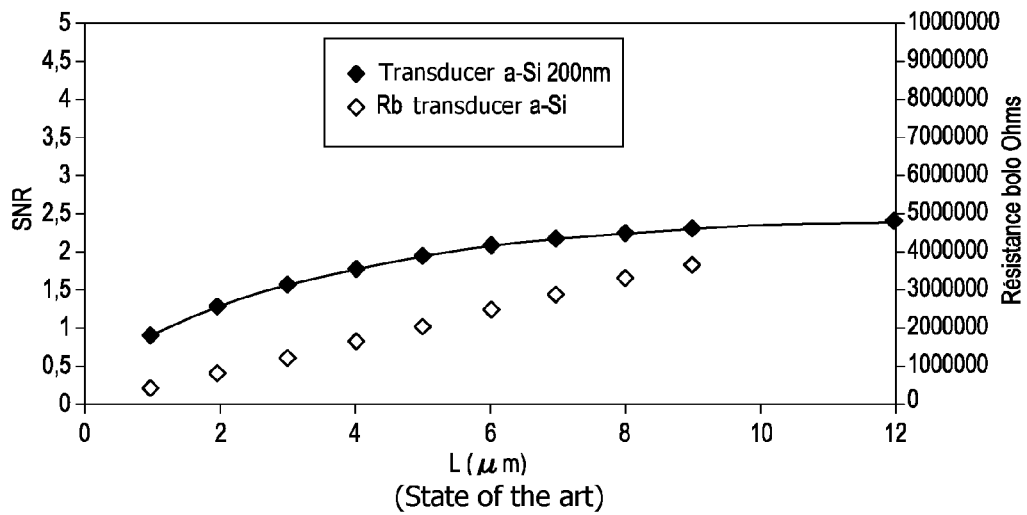
(State of the art)
Fig. 4
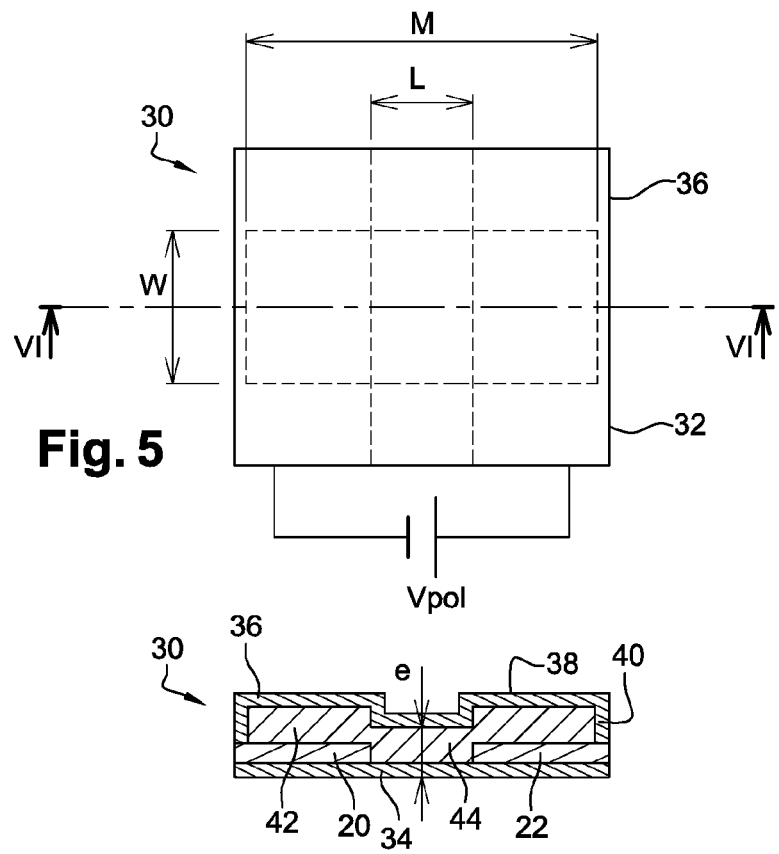
Fig. 5
Fig. 6

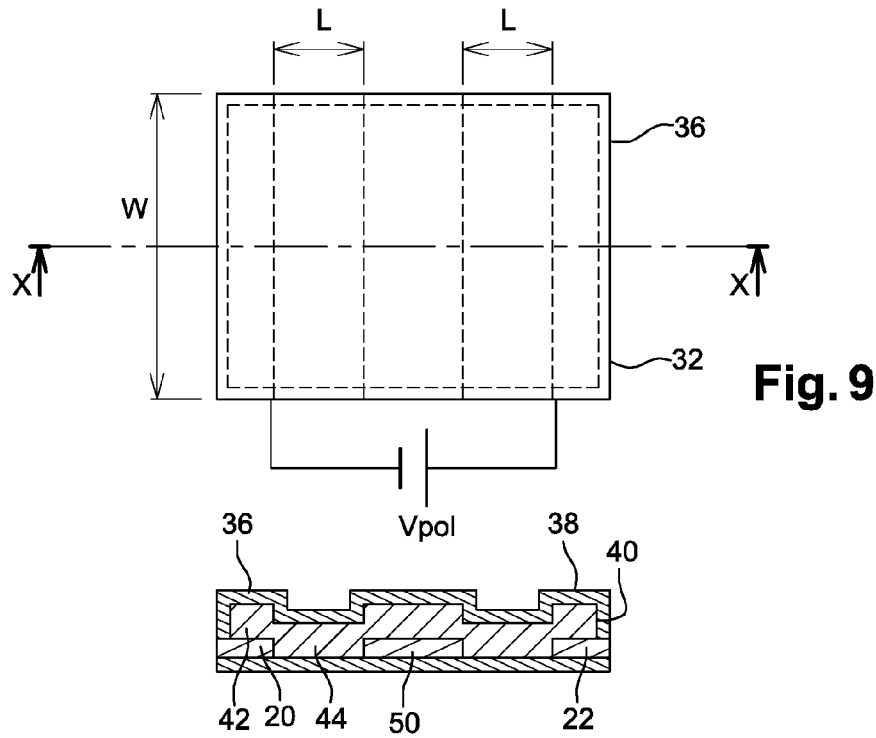
Fig. 9
Fig. 10
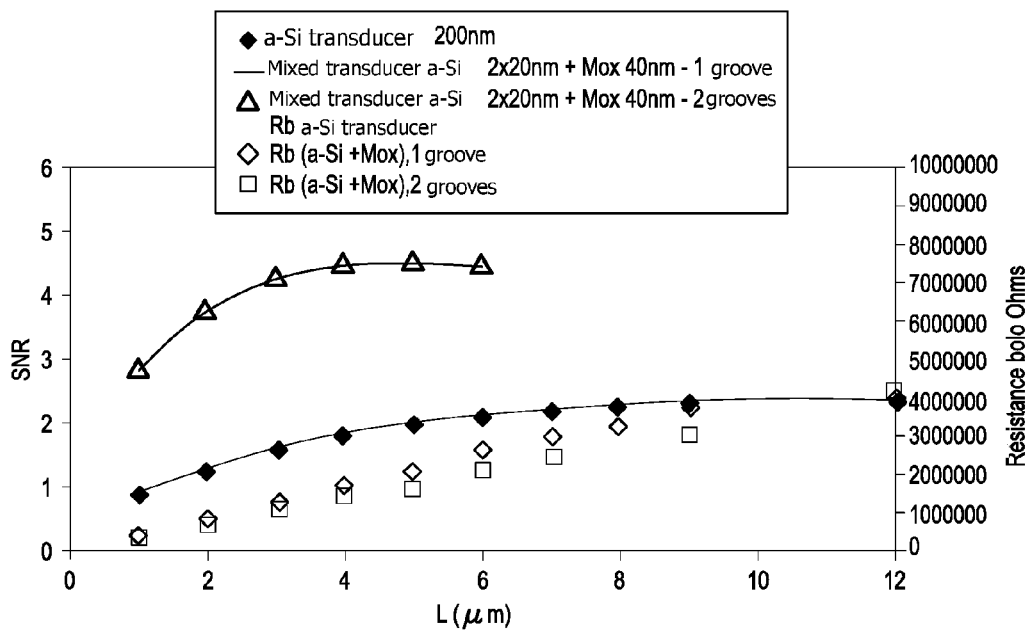
Fig. 11

DETECTION DEVICE WITH SUSPENDED BOLOMETRIC MEMBRANES HAVING A HIGH ABSORPTION EFFICIENCY AND SIGNAL-TO-NOISE RATIO

TECHNOLOGICAL DOMAIN

The present description relates to the field of electromagnetic radiation detectors, particularly of detectors comprising microbolometers intended for the detection of radiations, typically in the "thermal" range, in other words, in infrared.

BACKGROUND

Infrared radiation (IR) detectors are typically manufactured in the form of a two-dimensional juxtaposition (for example, in an array) of an assembly of elementary microbolometers arranged at the surface of a support substrate, each microdetector being intended to form an image point. Each microdetector comprises a membrane suspended above the substrate and electrically connected thereto by means of long narrow beams (or "arms") embedded in electrically-conductive pillars. The assembly is placed in a tight enclosure, for example, a package under very low pressure, to suppress the thermal conductance of the surrounding gas.

Each membrane heats up by absorbing the incident radiation originating from the observed thermal scene, which is transmitted and focused by an adequate optical system at the level of the focal plane having the membranes arranged thereon. The membrane comprises, in particular, a layer of a "transducer" material having an electric property, the resistivity in the case of microbolometers, which strongly varies when the temperature changes, for example generating a current variation under a constant voltage biasing, that is, an electric signal, proportional to the incident radiation flow.

Conventional methods of manufacturing detectors of this type comprise steps directly carried out at the surface of a substrate comprising a plurality of electronic circuits or "read-out integrated circuits" or "ROICs", in so-called "monolithic" fashion. This term designates a continuous sequence of operations on the same substrate, after the integrated circuit manufacturing process, usually based on silicon. Bolometric microdetector manufacturing steps are generally similar to collective manufacturing techniques usual in microelectronics, usually concerning from a few tens to a few hundreds of array detectors arranged on a same substrate.

During the manufacturing steps, the components implementing the bolometric functions of optical absorption, optical-thermal transduction, and thermal resistance, are formed at the surface of a so-called "sacrificial" layer, in that the layer, simply intended to form a construction base, is removed at the end of the process by an adequate method which does not attack the other detector parts, and particularly the components formed thereon. Typically, a polyimide layer is used, which layer is eventually removed by combustion in an oxygen plasma. As a variation, the sacrificial layer is a silicon oxide layer (generally designated by "SiO" eventually removed by hydrofluoric vapor phase etching (HFv). After the removal of the sacrificial layer, the bolometric membranes remain suspended above the substrate, with no other contact or fastening than their holding arms embedded in the pillars.

The most common manufacturing method for forming suspended membranes is called "above IC" or "MEMS-on-top". According to this method, the microdetectors are directly constructed at the surface of the substrate comprising the read-out circuits, due to specific methods. Particularly, the sacrificial layer is of organic nature—generally polyimide—and the transducer material most often is an oxide having a semiconductor character (VOx, NiOx) or amorphous silicon (a-Si). Conventionally, for the usual "far" infrared detection (LWIR), a beam splitter is also formed between the absorbing membrane and a reflector arranged at the substrate surface, to provide an absorption maximum for the detector in the vicinity of 10 micrometers. Thus, to connect and hold the membrane at an adapted distance from the reflector, to form said beam splitter in vacuum, electric pillars with a large aspect ratio, usually rather complex and having a non-negligible bulk, should be formed through a thick temporary (sacrificial) polyimide layer having a thickness in the range from 2 to 2.5 micrometers.

The dielectric or resistive layers which form the membrane "skeleton" are conventionally made of silicon oxide (SiO) or of silicon nitride (generically noted SiN), or also directly of semiconductor amorphous silicon according, for example, to U.S. Pat. No. 5,912,464. Such materials can be deposited at relatively low temperature and are inert towards the method of removing the organic sacrificial layer under an oxygen plasma. Such an "above IC" manufacturing process is typically formed of some ten photolithographic "levels", that is, according to a relatively complex and expensive process.

More recently, a new type of membrane manufacturing has been provided, which comprises integrating the microbolometers in the so-called "back-end of line" layers (or "BEOLs"), in the same way as the components generally achieving the MEMS functions. This acronym designates the steps of manufacturing all the metal interconnects at relatively low temperature, characteristic of the end of standard microelectronic manufacturing processes. Such an approach, called "MEMS-in-CMOS", aims at using certain BEOL layouts, mature on an industrial level, to integrate part of the microbolometers components. In particular, the metallized vertical interconnection vias between successive BEOL metal levels, for example obtained according to the "damascene" method, advantageously form the microdetector pillars. Further, "IMDs" (Inter-Metal-Dielectrics), in particular made of SiO, a standard material in microelectronics, may advantageously be used as sacrificial layers for the construction of membrane structures. In this type of integration, the last photolithographic levels for the read-out circuit manufacturing are also used to directly form the pillars supporting the membranes. A few lithographic levels in the series of levels necessary to manufacture microbolometers are thus spared, which results in a significant saving on manufacturing costs. However, the removal of the SiO sacrificial layer of the "MEMS-in-CMOS" manufacturing is in this case only feasible by means of vapor-phase hydrofluoric acid (HFv). Accordingly, all the materials forming the microbolometers should imperatively be inert with respect to this very chemically aggressive method.

Such a "MEMS-in-CMOS" approach, applied to the case of microbolometers, has been described in document US 2014/319350, which details the integration in the CMOS stack of a SiO sacrificial layer and of a barrier layer enabling to contain the HFv etching, as well as the forming of the microbolometer "pillars" by using the last structure of connection between standard metal levels (metallized vias) of the CMOS assembly. This document more particularly describes a microbolometer construction based on amorphous silicon which uses the teachings of document U.S. Pat. No. 5,912,464 for the membrane architecture. A structure compatible with the HFv etching and formed by means of five photolithographic levels only is thus obtained, which provides a very significant gain as compared with the much more complex process of the state of the art.

While the "MEMS-in-CMOS" technique enables to simplify the manufacturing, it however suffers from limitations which penalize the performance of the microbolometers thus constructed.

In particular, the architecture provided according to this technique imposes a sharing of the space available between metallized areas intended, in particular, to absorb the incident radiation, and areas only occupied by the transducer material (amorphous silicon). The fraction of the surface area occupied by the metal conditions the optical-thermal transduction function (optical absorption efficiency ε of the membrane), while the remaining surface area fraction is dedicated to the thermoelectric transduction function in the transducer material. Such a limitation of the volume of material implied in the electric conduction (as compared with the total volume of amorphous silicon present in the structure) generates a decrease in the number of charge carriers N implemented in the conduction. This necessarily results in a substantial increase in the low-frequency noise ("B1/f") in accordance with Hooge's relation, which penalizes the signal-to-noise ratio ("SNR") of the detector.

To better understand this issue, reference is made to FIGS. 1 to 3, illustrating an elementary resistive bolometric microdetector 10 (or "microbolometer") of the state of the art for infrared detection. Bolometer 10 comprises a thin membrane 12 absorbing the incident radiation, suspended above a substrate—support 14 via two conductive anchoring pillars 16 to which it is attached by two holding and thermally-insulating arms 18. In the illustrated example, membrane 12 comprises two metal elements 20, 22 having an IR absorbing and biasing electrode function, and an amorphous silicon layer 24 covering each of the two electrodes 12, 14 and filling space 18 therebetween. Layer 24 has a function of transduction of the heating caused by the absorption of the radiation by electrodes 20, 22 into an electric resistance variation. In this structure, the transducer material is thus only made of amorphous silicon, which has the advantage of being inert with respect to the sacrificial layer releasing process based on vapor-phase hydrofluoric acid.

Response $\mathcal{R}$ (V/K) of a microbolometer of electric resistance Rb biased under a constant voltage Vpol expresses the output signal variation ∂S in relation with a scene temperature variation $\partial \theta_{sc}$ according to general relation:

$$\mathcal{R} = \frac{\partial S}{\partial \theta_{sc}} \propto \frac{Vpol}{Rb} A * \varepsilon * TCR * R_{th} * \frac{\partial \theta(\theta_{sc})}{\partial \theta_{sc}} \quad (1)$$

where:
A is the total area of the sensitive elementary point (detector pixel),
ε is the general optical absorption efficiency of the bolometer,
TCR is the variation coefficient of the bolometer resistance according to the membrane temperature;
$R_{th}$ is the thermal resistance between the membrane and the substrate (that is, the holding arms), and
$\otimes(\theta_{sc})$ is the radiation flow emitted by the scene at temperature $\theta_{sc}$.
As previously mentioned, optical absorption efficiency ε is linked to the fraction of the surface area of each membrane occupied by the metal deposited for this purpose.

The electric resistance of a microdetector Rb can be expressed according to resistivity ρ of the transducer material, for example, according to relation:

$$Rb = \rho * \frac{L}{W * e} \quad (2)$$

where L, W and e respectively are the length, the width, and the thickness of the volume of transducer material (assumed to have or taken down to a parallelepipedal shape) conducting the electric current.

In the example of membrane of FIG. 1, these dimensions are substantially those of the area separating electrodes 20, 22, for example corresponding to a physical interrupt (or groove) formed in an initially continuous layer of metal to form the electrodes (which are in this example typically called "coplanar" since they are arranged at the same level).

The combination of relations (1) and (2) thus enables to specify the response of a microdetector according to the dimensional parameters of the involved resistor Rb.

The current noise power of a resistor biased under a voltage Vpol can be expressed by the quadratic sum of the so-called 1/f low-frequency noise ($I_{b1/f}$) and of a frequency-independent component called "white noise" ($I_{bb}$). The ultimate noise linked to thermal fluctuations can be neglected as compared with these first-order contributors.

Noise power $I_{b1/f}^2$ varies according to the inverse of number N of charge carriers contained in the volume concerned by the current lines, according to Hooge's relation:

$$I_{b1/f}^2 = \frac{\alpha_H}{N} * \left(\frac{Vpol}{Rb}\right)^2 * \ln(BPCL) \quad (3)$$

where $\alpha_H$ is the "Hooge parameter" and "BPCL" is the frequency bandwidth of the read-out circuit. Each material is characterized by a reference ratio $$\frac{\alpha_H}{n},$$

where n is the charge carrier volume density; this ratio further depends on temperature. Thus, for a resistor Rb of known dimensions, the real ratio $$\frac{\alpha_H}{N}$$

of the considering element is simply calculated from dimensional parameters W, L, e according to relation:

$$\frac{\alpha_H}{N} = \frac{\alpha_H}{n} * \left(\frac{1}{W * L * e}\right) \quad (4)$$

White noise power $I_{bb}^2$ only depends on temperature and on the resistance of the considered element according to relation:

$$I_{bb}^2 = \frac{4 * k * T}{Rb} * (BPCL) \quad (5)$$

where k designates Boltzmann's constant and T designates temperature.

A microdetector provided with a portion of transducer material characterized by its ratio $$\frac{\alpha_H}{N}$$

and its resistance Rb, defined from known dimensions W, L, and e, thus exhibits a total noise $I_b$ which can be expressed according to relation:

$$I_b = \sqrt{\left[\frac{4*k*T}{Rb}*(BPCL) + \frac{\alpha_H}{N}*\left(\frac{Vpol}{Rb}\right)^2 *\ln(BPCL)\right]} \quad (6)$$

The microdetector signal-to-noise ratio (SNR) can be calculated by the ratio of the response (1) to the noise (6) by taking into account the elements defined by the read-out circuit (Vpol, BPCL) and the dimensional parameters of the resistor of each microdetector (W, L, e) which enable to express bolometric resistance Rb and the number of charge carriers N. Ratio SNR can thus be expressed according to relation:

$$SNR \propto \left(\frac{\mathcal{R}}{I_b}\right) \quad (7)$$

To give a simplified, though representative, illustration of a pixel of very small dimensions such as it is currently useful, or even necessary, to industrially provide, the case of an elementary bolometric detector having a 12×12-μm² surface area is considered.

To define the sharing of this available surface between a metallized fraction 20, 22 necessary for the absorption of the thermal radiation, and an electrically-active fraction 26 intended for thermoelectric transduction, a groove of (electric) length L etched in a metal layer across the entire (electric) width W=12 μm of this element may be conveniently defined. The ratio of surface area occupied by the metal is then equal to (12-L)/12, while the length and width of the resistor respectively are L and W=12 μm. Equations (2), (4), and (7) result in bolometric resistance (Rb), in ratio $$\frac{\alpha_H}{N},$$

and then finally in the SNR according to design length L.

Thus, neglecting, for simplification, the spaces consumed to form the separations between adjacent membranes and the sub-structures such as pillars, holding arms, and other various necessary spaces, an area of 12*12 μm² comprising two rectangular metallized portions separated by a groove of length L, which is also the length of an amorphous silicon transducer volume of width W=12 μm, of indicative resistivity 100 Ω.cm, of typical thickness e=200 nm, and of ratio $$\frac{\alpha_H}{n} = 6.7E - 28 \text{ m}^3$$

is considered in the following as schematized in FIG. 1, resistance Rb and the SNR have a variation according to distance L illustrated in FIG. 4.

To provide an optimal optical absorption efficiency ϵ, it is necessary to set the length of the non-metallized areas to values at most in the range from 2 to 3 μm. This spacing (length L) is further necessary to maintain resistance Rb of the elementary bolometer within a range of values compatible with an adequate use of the read-out circuit, in terms of biasing Vpol, of read integration time, and of useful dynamics (with no saturation) of the output amplifier. This condition is typically satisfied when bolometric resistance Rb is in the order of or smaller than approximately 1 MOhm. For more explanations in relation with these elements, reference will for example be made to "Uncooled amorphous silicon technology enhancement for 25 μm pixel pitch achievement"; E. Mottin et al, Infrared Technology and Application XXVIII, SPIE, vol. 4820E.

Thus, with a length L set to 2 μm to guarantee a state-of-the-art absorption efficiency and an acceptable resistance, the SNR of this microdetector based on amorphous silicon will be limited to approximately 60% of its maximum value corresponding to large lengths L (not including absorption losses). Such a limitation is linked to the increase of the low-frequency noise at low values of L.

It is thus difficult, or even impossible to obtain an acceptable tradeoff between the absorption efficiency and the SNR for sensitive pixels of small dimensions formed according to this simplified assembly, particularly for pitches smaller than 20 μm. The use of low-noise transducer materials at low frequency, such as semiconductor metal oxides (VOx, TiOx, NiOx, for example—generic denomination "MOx" will be used hereafter), would in principle enable to overcome this limitation. However, the use of such materials in the stack of the state of the art is not possible, since they would be rapidly removed or at least strongly degraded under the effect of the very aggressive HFv releasing chemistry.

There thus is a need, at least in the context of microbolometer assemblies partly integrated to a CMOS process, that is, where the sacrificial material is made of SiO or of any related material conventional in microelectronics, for high-performance devices and for methods of manufacturing the same compatible with the design of retinas of very small pitch, typically below 20 μm.

SUMMARY OF THE SPECIFICATION

The present description thus aims at providing a detector with suspended bolometric membranes, which membranes having an architecture allowing a high performance in terms of absorption efficiency and of SNR, and having an architecture which may be, if necessary, manufactured according to a technology requiring the use of a very aggressive sacrificial layer releasing chemistry.

For this purpose, the presently described embodiments aim at a bolometric detection device comprising, in one embodiment:

a substrate comprising a read-out circuit;

an array of elementary detectors each comprising a membrane suspended above the substrate and connected to the read-out circuit by at least two electric conductors, said membrane comprising two electrically-conductive electrodes respectively connected to the two electric conductors, and a volume of transducer material electrically connecting the two electrodes, wherein the read-out circuit is configured to apply an electrical stimulus between the two electrodes of the membrane and to form an electric signal as a response to said application.

In embodiments, said volume comprises:

a volume of a first transducer material electrically connecting the two electrodes of the membrane and forming walls of a closed enclosure having each of the electrodes at least partially housed therein; and a volume of a second transducer material, electrically connecting the two electrodes and housed in the enclosure, the electric resistivity of the second material being smaller than the electric resistivity of the first material.

"Transducer" means a material having a resistivity in the range from 0.1 to $10^4$ Ohm.cm and having a negative thermal coefficient of resistance TCR.

The present description also aims at a method of manufacturing a bolometric detection device, comprising:

manufacturing a substrate comprising a read-out circuit;

depositing a sacrificial layer on the substrate;

manufacturing, on the sacrificial layer, an array of membranes, each connected to the read-out circuit by at least two electric conductors, said membrane comprising two electrically-conductive electrodes respectively connected to the two electric conductors, and a volume of transducer material electrically connecting the two electrodes;

once the membranes have been manufactured, removing the sacrificial layer.

According to an aspect, the manufacturing of the transducer volume comprises:

depositing a lower layer of a first transducer material on the sacrificial layer;

forming, on said layer of the first material, the two membrane electrodes;

depositing on and between the electrodes a layer of second transducer material; and encapsulating the layer of second transducer material with an upper layer of the first material to also partially cover the two electrodes.

Further:

the electric resistivity of the second material is smaller than the electric resistivity of the first material;

the first material is inert to the removal of the sacrificial layer.

In other words, the transducer material is formed of a "shell" and of a "core" electrically in parallel with respect to the electrodes forming the radiation absorption means, the core being formed of a material of smaller resistivity than the shell, particularly, at least 5 times smaller, and typically from 10 to 20 times smaller.

Particularly again, the shell is made of a material having a resistivity greater than 10 Ohm.cm.

This type of architecture enables to have a decreased low-frequency noise component ($I_{b1/f}$), essentially implemented by the core due to the core resistivity, while allowing, due to the shell, an appropriate selection of the material according to the manufacturing technology, for example, a shell inert to the chemical attack for releasing the sacrificial layer in the context of a MEMS-in-CMOS technology.

According to an embodiment, the two electrodes are coplanar and only separated by one groove. As a variation, the two electrodes belong to a series of at least three electrically-conductive coplanar areas, separated from one another by parallel grooves arranged between the two electrodes.

According to an embodiment, the membrane comprises a continuous layer of electric insulator extending between the electrodes and partially covering each of them.

According to an embodiment, the electric resistivity of the second material is at least five times smaller than the electric resistivity of the first material and preferably from ten times to twenty times smaller.

According to an embodiment, the first material has an electric resistivity greater than 10 Ohm.cm, and preferably a resistivity smaller than $10^4$ Ohm.cm.

According to an embodiment, the first material is amorphous silicon, an amorphous alloy of silicon and germanium of formula $Si_xGe_{(1-x)}$, or an amorphous alloy of silicon and carbon of formula a-$Si_xC_{(1-x)}$, and the second material is a metal oxide.

According to an embodiment, the sacrificial layer is removed by a HFv hydrofluoric acid etching, and the first material is amorphous silicon, an amorphous alloy of silicon and germanium of formula a-$Si_xGe_{(1-x)}$, or an amorphous alloy of silicon and carbon of formula a-$Si_xC_{(1-x)}$.

According to an embodiment, the two electrodes are formed by depositing a layer of electrically-conductive material and by only forming one groove in said layer down to the lower layer of first material.

According to an embodiment, the two electrodes are formed by depositing a layer of electrically-conductive material and by forming at least two parallel grooves in said layer down to the lower layer of first material.

According to an embodiment, the method comprises, before depositing the second transducer material, depositing an electrically-insulating layer extending between the electrodes and partially covering each of them.

BRIEF DESCRIPTION OF THE DRAWINGS

The presently described embodiments will be better understood on reading of the following description provided as an example only in relation with the accompanying drawings, where the same reference numerals designate the same or the like elements, among which:

FIG. 4 is a plot of the signal-to-noise ratios according to the length of the space between electrodes of a membrane of FIG. 1;

FIGS. 5 and 6 are simplified top and cross-section views of a bolometric membrane according to a first embodiment;

FIGS. 9 and 10 are simplified top and cross-section views of a bolometric membrane according to a second embodiment;

FIG. 11 is a plot of the signal-to-noise ratios according to the length of the space between electrodes of a membrane of FIG. 1 and of a membrane according to the first and second embodiments;

DETAILED DESCRIPTION OF THE SPECIFICATION

First Embodiment

Figure 1:
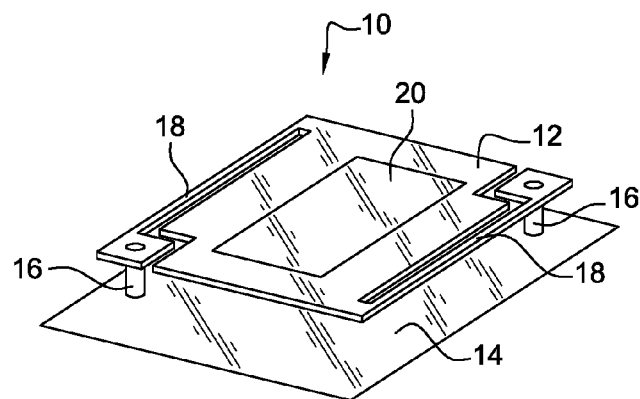
FIG. 1 is a simplified perspective view of a bolometric membrane of the state of the art suspended above a read-out circuit.
Figure 2:
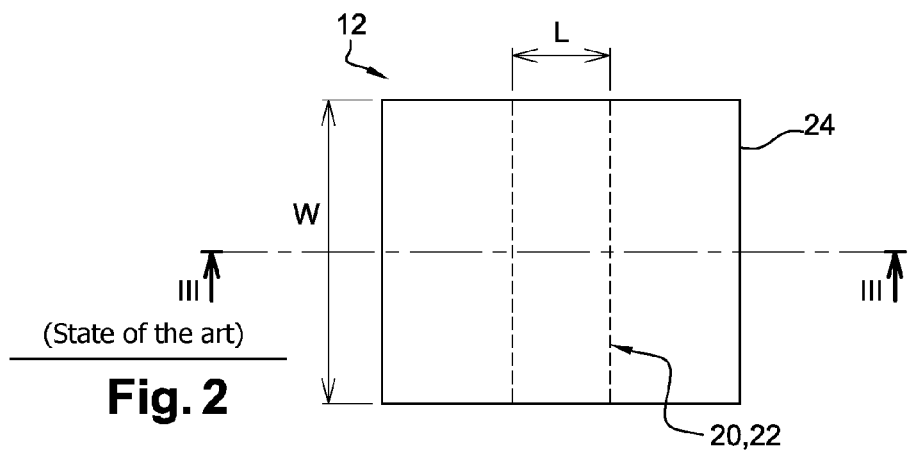
FIGS. 2 and 3 are simplified top and cross-section view of the membrane of FIG. 1.
Figure 3:
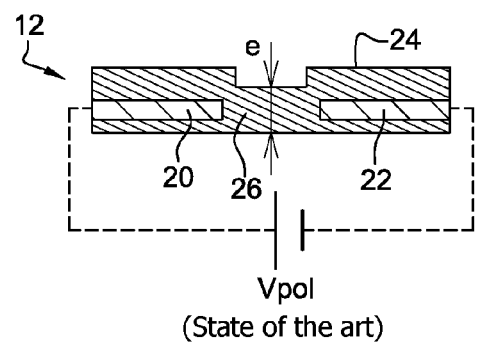

Referring to FIGS. 5 and 6, a bolometric microdetector membrane 30 comprises:

an encapsulation shell 32, advantageously made of amorphous silicon, comprising a lower or "base" layer 34, and an upper cap 36 formed of an upper layer 38 and of lateral walls 40, defining together an internal volume 42 of width W, of length M, and of height e;

two conductive electrodes 20, 22, for example, metallic, resting on lower layer 34 and entirely covering the latter, except for an interrupt (or groove) of (electric) length L physically separating them. Upper cap 36 further rests on each of electrodes 20, 22, thus defining a first conduction channel therebetween as well as a cavity tight to aggressive chemical processes for internal volume 42;

a core 44 totally filling internal volume 42, and accordingly resting on each of electrodes 20, 22, and thus defining a second conduction channel between the latter, of width W and of thickness e, in parallel with the first conduction channel. Core 44 is made of a material having a smaller resistivity than the shell material, at least 5 times smaller, and typically from 10 to 20 times smaller. Particularly, core 44 is made of a metal oxide having a negative TCR coefficient, for example, VOx and/or TiOx and/or NiOx, defining a second conduction channel provided with a low low-frequency noise coefficient.

In this configuration, the current flows between the two metal poles 20, 22, in the metal oxide across width W and in the amorphous silicon across substantially the entire pixel width (e.g. 12 µm). In the example considered herein, the two lower 34 and upper 38 amorphous silicon layers have an equal thickness, that is, 20 nanometers. Width W and thickness e of the MOx are variables of adjustment of resistance Rb of the pixel. They have here been set to 6 µm and 40 nm, respectively, to obtain a resistance Rb close to 800 KΩ for L=2 µm.

The two current contributions, flowing through the two transducer materials, are add to each other for the calculation of response R, and are quadratically summed for the estimation of the noise. One thus obtains for the latter:

$$I_b = \sqrt{I_{b(\alpha-Si)}^2 + I_{b(MOx)}^2} \quad (8)$$

The SNR ratio can thus be calculated for the case of the pixel schematized in FIGS. 5 and 6, according to length L of the conduction channel, for example, in simplified fashion, admitting that the TCR coefficient is comparable for the two transducer materials.

Figure 7:
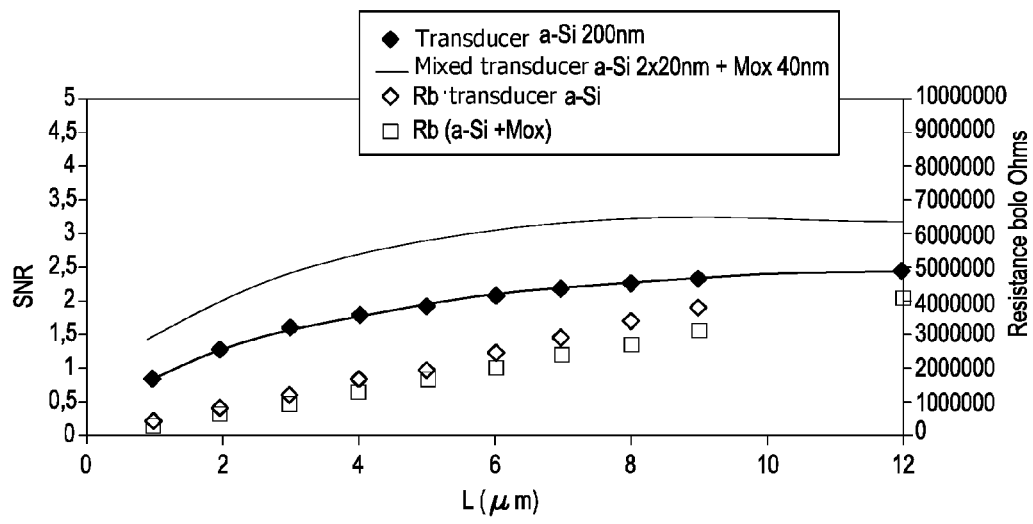
FIG. 7 is a plot of the signal-to-noise ratios according to the length of the space between electrodes of a membrane of FIG. 1 and of a membrane according to the first embodiment.

The graph of FIG. 7 shows that the insertion of a layer of metal oxide transducer material which is ten times less resistive than amorphous silicon and generates little low-frequency noise for a same resistance Rb enables to largely compensate for the degradation of the SNR caused by the decrease of L down to around 2 µm. A ratio $\alpha_H/N = 2.6 \text{ E-29}$ $m^3$ for the second transducer material has been admitted for the construction of all graphs, which value is considered representative of the known technique.

Thus, the SNR obtained for L=2 µm in the configuration (approximately 2 arbitrary units, or a.u.) is equivalent to the value accessible for L=6 µm only formed of a transducer a-Si having a 200-nm thickness according to the assemblies described in document U.S. Pat. No. 5,912,464.

Figure 8:
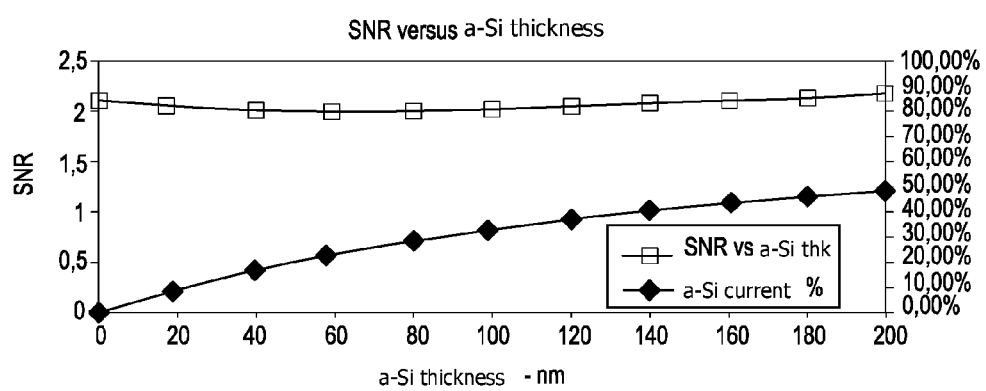
FIG. 8 is a plot of signal-to-noise ratios according to the amorphous silicon thickness in a membrane.

The current flowing through the amorphous silicon, which represents 17% of the total current in this example, contributes to response R due to its TCR equivalent to that of the MOx (relation 1), and only marginally affects the general noise (relation 6). The wider use of the indicated relations shows that the proportion of current flowing through the amorphous silicon path may vary—in relation with the thickness of the amorphous silicon—within a very wide range without for this to significantly impact the SNR, as shown in FIG. 8.

Second Embodiment

If, in the embodiment which has just been described, the introduction of transducer oxide MOx has allowed a significant gain on the SNR, low-frequency noise $I_{b1/f}$ however remains dominant at L=2 µm, and thus keeps on limiting the SNR of the microdetector.

To further decrease the dominant noise linked to the small volume of material conducting the current through parameter N, according to a second embodiment, at least two parallel and identical interrupts or grooves are defined, for example, each having a length L. The effective length of the conduction channel thus becomes P*L, where P is the number of grooves. Thus, the volume of active material in the conduction is doubled for P=2, while the fraction of metallized surface corresponding to the electrodes, which is optically absorbing but defines equipotential surfaces inactive in terms of transduction, varies from 83% to 67%. The loss generated on absorption ε can be evaluated to be in the range from 10 to 15%, that is, smaller than the surface area loss, due to the narrowness of the grooves relative to the radiation wavelength, that is, typically 10 µm for LWIR detection.

Referring to the relations disclosed for the membrane having one groove (FIGS. 5 and 6), the calculation of the SNR may be performed for a sensitive membrane comprising two grooves, thus defining two electrodes 20, 22 interposing a metal area 50 (FIGS. 9 and 10), considering that the effective length of the resistor is equal to 2*L. Physical quantity L (e.g. of each groove) in this case can only be scanned up to 6 µm, beyond which the entire pixel would be demetallized (with the disappearing of the contacts and thus of the bolometric resistor).

The stack of layers remains that of the previous example, that is, two 100-Ω.cm a-Si layers (base and encapsulation layer) of 20 nm each, and one 10-Ω.cm oxide layer MOx having a 40-nm thickness. Only width W of channel MOx has been enlarged in this case to 12 µm to keep (with two grooves) a resistance Rb close to that of the pixel comprising a single groove with W=6 µm.

The graph of FIG. 11 shows that with two grooves of width L=2 µm, the SNR is almost doubled as compared with the case comprising a single groove (3.8 vs. 2.0 a.u.). This gain can be associated with the reduction of the low-frequency noise resulting from the doubling of the active material volume and thus from the number of implied carriers N.

The degradation of absorption ε due to the addition of a second groove, estimated to approximately 10%, is thus very largely overcompensated by the increase of the SNR.

Third Embodiment

The third embodiment, illustrated in FIGS. 12 to 15, differs from the above-described embodiments by the insertion of a layer of electric insulator, for example, of dielectric. Particularly, layer 52 is inserted between metal elements 20, 22 (FIGS. 12 and 13 corresponding to the supplemented first embodiment) or 20, 22, 50 (FIGS. 14 and 15 corresponding to the second embodiment) and transducer MOx 44, all over their common occupied surface area, except along two strips 54, 56 parallel to the groove(s) of length L and located along and close to two opposite edges of the membrane. Thus, effective length L', that is, the total electric length of the path of the current lines between the two electric terminals of the conduction channel in the second transducer MOx 44, can be increased so that L'>>L, independently from optical absorption ϵ.

The consecutive increase of the volume of MOx—and thus of the number of charge carriers N—results in a decrease in the noise 1/f generated in this layer.

Figure 12:
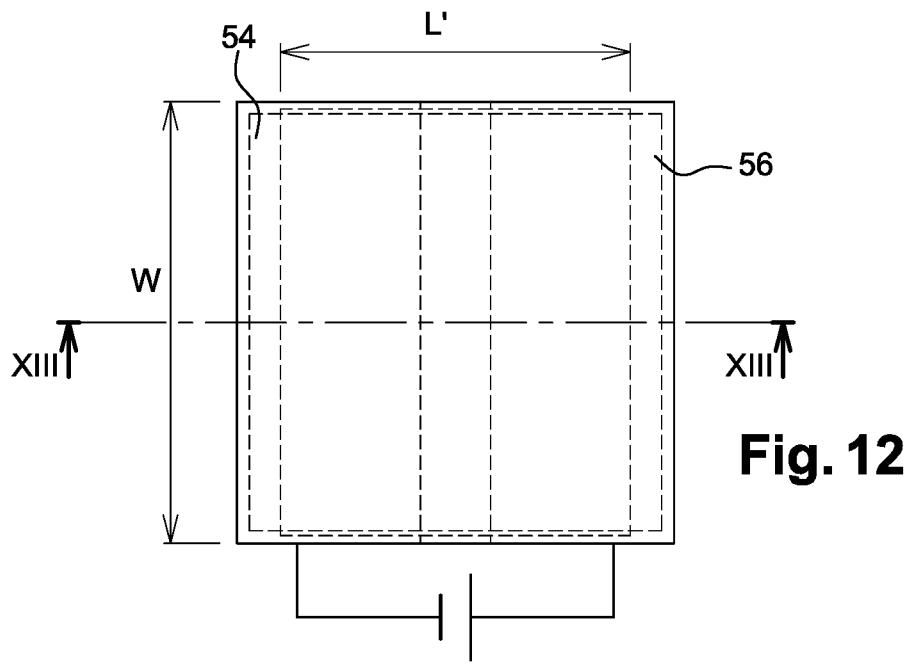
FIGS. 12 and 13 are simplified top and cross-section views of a bolometric membrane according to a third embodiment.
Figure 13:
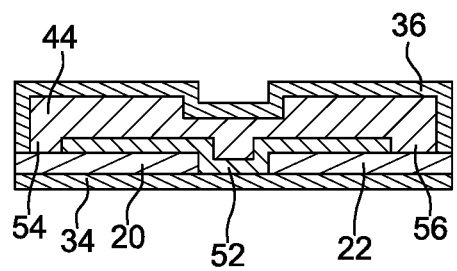
Figure 14:
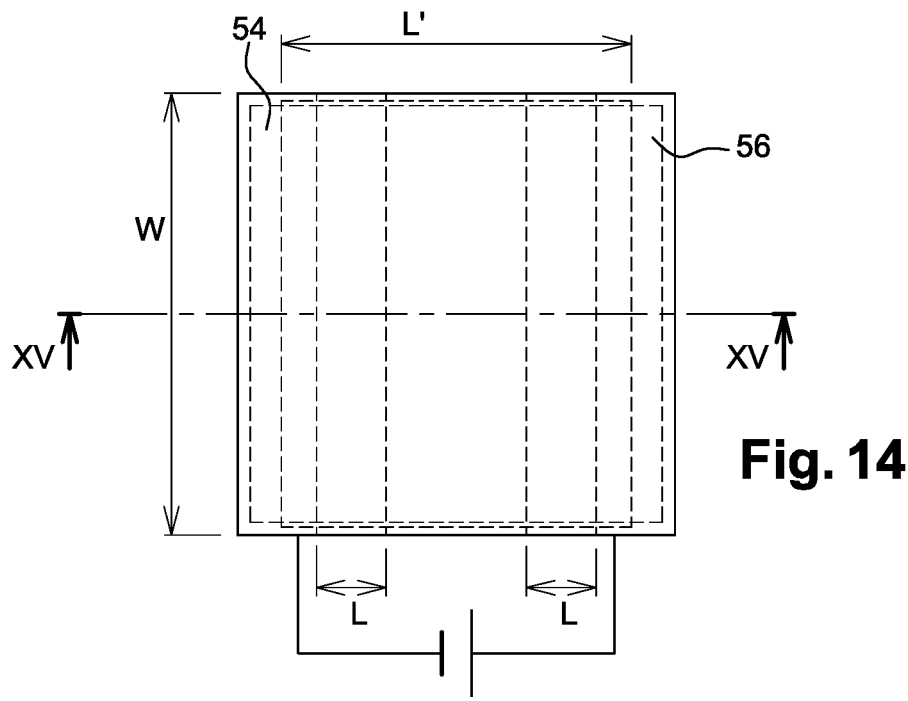
FIGS. 14 and 15 are simplified top and cross-section views of a bolometric membrane according to a third embodiment.
Figure 15:
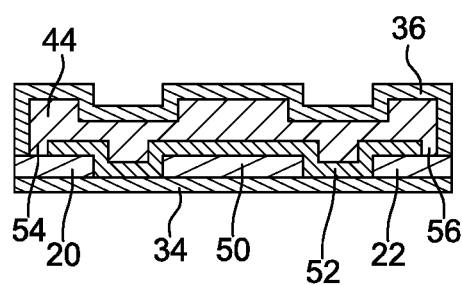

For example, considering a membrane such as illustrated in FIGS. 12 and 13 with a single groove, setting L'=8 µm and comprising a groove of length L=2 µm in the metal layer, to respect the criterion imposed in the previous embodiments on resistance Rb, the thickness of layer MOx may be doubled in this case to compensate for the increase of length L' of the conduction channel in this material. The layer of transducer oxide at (for example) 10 Ω.cm will thus have a 80-nm thickness and is defined across a width W=12 µm, which results in a resistance Rb close to 800 Ω comparable to the previous modes.

In the third embodiment, a first portion of the current runs through the silicon of base layer 34 along a length L if the pixel comprises a single groove (case a/ of FIG. 12 and 13) or 2*L if two grooves (case b/ of FIGS. 14 and 15) have been positioned. Another portion of the current runs through upper encapsulation layer 36 along a greater length L', this other portion of the current being thus proportionally smaller.

By applying equations (1) to (8) to the different current contributions present in this embodiment, and by using the above-listed parameters (MOx 44 with W=12 µm, e=80 nm at 10 Ω.cm and $\alpha_H/n=2.6E-29$ m$^3$, inserted between two a-Si layers each having a 20-nm thickness at 100 Ω.cm), this results in a SNR estimate of the following table for configurations a/ and b/ with one and two grooves, respectively.

| Membrane with an electric insulator layer | Rb (KΩ) | SNR (a.u.) |
|---|---|---|
| 1 groove (L = 2 µm) | ~741 | 3.84 |
| 2 grooves (L = 2 µm) | ~775 | 5.81 |

The insertion of electric insulator layer 52, partially insulating electrodes 20, 22 of MOx transducer 44, enables to reach, with a single groove L=2 µm, the same SNR value, that is, 3.8 a.u., as in the second embodiment (FIGS. 9 and 10), without insulator layer 52, but with two grooves of length L=2 µm, as shown in the curves of FIG. 11.

If a second groove having a 2-µm length is introduced into this type of membrane (FIGS. 14 and 15), the SNR reaches 5.8 a.u. This gain is due to the decrease of the low-frequency noise generated by base a-Si layer 34, dominant in the case of a single groove.

This ultimate SNR level is obtained as a counterpart, acceptable in most cases, to the addition of an additional dielectric layer in the assembly, and of an additional photolithography level.

It should be specified that such a specific construction requires placing the limits of the dielectric layer at the pixel periphery, at any point inscribed within the limits of the base and encapsulation layer, to avoid providing, if need be, an entry point to the HFv sacrificial layer removal method.

It should also be noted that the previously-introduced limitation to one or at most two grooves corresponds to the very specific and exemplary context of the manufacturing of very small pixels (elementary detectors) having a 12×12-µm$^2$ surface area occupation. If allowed by the technology or for larger pixels, some embodiments, still as advantageous, may call for the defining of three or more grooves, according to the pixel pitch. Indeed, ratio W/L should be maintained approximately constant to avoid excessively modifying resistance Rb, and spaces (grooves) of limited width should be kept to avoid excessively deteriorating the optical absorption.

Similarly, the use of amorphous silicon to form the tight shell for the second transducer material is specified. It should be specified that the same result will be obtained by means of silicon and germanium alloys of a-Si$_x$Ge$_{(1-x)}$ type or of amorphous silicon and carbon alloys of a-Si$_x$C$_{(1-x)}$ type.

The resistivity range to be considered as typical while substantially providing the attached advantages thus extends between 10 Ohm.cm and 10$^4$ Ohm.cm.

Manufacturing Method

A manufacturing method according to an embodiment will now be described, starting with the steps of manufacturing the stack of the CMOS substrate of the read-out circuit according to the teachings of document US 2014/319350. The method enables to manufacture a bolometric detector by means of a limited number of photolithographic levels, however compatible with the use of any type of transducer material, advantageously essentially MOx.

More particularly, the manufacturing method is a technique of assembling membranes compatible with a HFv-type sacrificial layer release, combining the use of a second metal-oxide type transducer material of low electric resistivity, jointly with a first transducer material such as amorphous silicon or a related alloy, intended to entirely protect the metal oxide during the final sacrificial dielectric material etching operation. A construction capable of outclassing the performance (signal-to-noise ratio) of the state of the art, in an economical way compatible with an integration in the CMOS manufacturing flow of the support ROIC is thus obtained.

Figure 16:
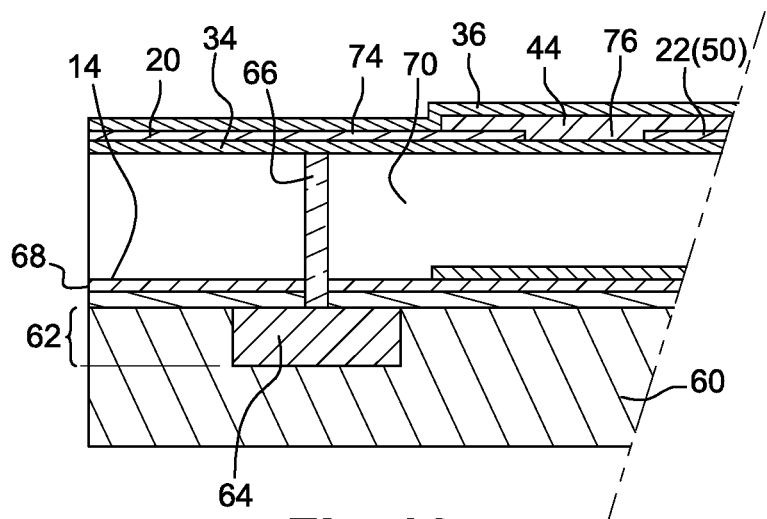
FIGS. 16 and 17 are simplified cross-section views illustrating a first method of manufacturing a membrane.
Figure 17:
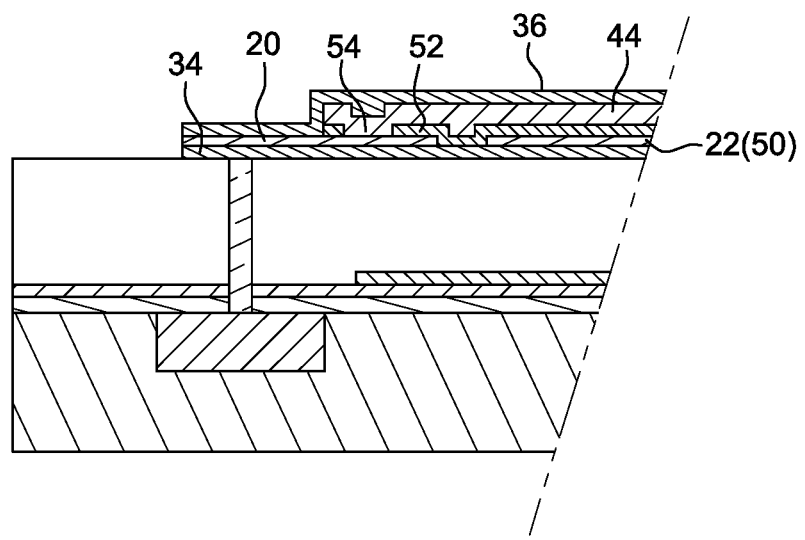

Referring to FIGS. 16 and 17, the method for example conventionally starts with the construction of an electronic read-out circuit in CMOS technology 60 comprising one or a plurality of levels 62 of interconnects 64 ("back-end" portion of CMOS circuit 60) particularly connecting functional blocks of read-out circuit 60 to one another, and intended to form input/output connections of read-out circuit 60. The metal continuity between the back-end layer of circuit 60 and each bolometric membrane is further formed by means of a metallized via 66 through a barrier layer 68, the mineral sacrificial layer (SiO) 70 and the base layer 34 from the layer metal of the CMOS to the metal layer 74 from which electrodes 20, 22 of the membrane will be formed (FIG. 16). The sequence of operations is chiefly described, for example, in document US 2014/319350.

The method carries on with the construction of the membrane compatible with the HFv releasing method, while integrating a second transducer material of smaller resistivity, with no additional steps. Referring to FIG. 16, the membrane manufacturing comprises:

etching metal layer 74 to define one or a plurality of grooves 76 of length L across the entire with of the membrane, and thus also two metal electrodes 20, 22;

depositing low-resistivity second transducer material 44, for example, and typically, a vanadium oxide (of generic formula VOx), or a nickel oxide (of generic formula NiOx), or a titanium oxide (of generic formula TiOx) directly on the metal of electrodes 20, 22, to form electric resistor Rb in the plane of the semiconductor layers, delimited by the non-metallized spaces;

defining by means of a dry or wet etching the extension along the plane of layer 44 of the second transducer material, typically according to a simple rectangle, of smaller dimensions than the final contour of the membrane, that is, at any point of its perimeter inscribed within this (future) contour, of said transducer material 44, selectively on the underlying metal and amorphous silicon;

depositing a second amorphous encapsulation silicon layer 36 preferably, but not necessarily, having a resistivity and a thickness identical to those of base layer 34;

defining the membrane contour and the thermal insulation arms and etching all the layers in place, that is, the two a-Si layers 34, 36, and the metal of electrodes 20, 22. The perimeter of this mask preferably crosses in no location the pattern of second transducer material 44, to create no local exposure thereof on the edge (that is, at least at certain points of the membrane perimeter) of the structure. Incidentally, such a layout eases the definition of the etch method.

According to this construction, comparable, for the holding structures, to the reference technique, the arms are only formed of the two a-Si layers which sandwich metal layer 74. a-Si layers 34 and 36 thus have comparable and preferably identical thicknesses, to avoid possible deformations due to differential internal stress.

The stack integrating a layer of electric insulator, for example, dielectric, of the third embodiment is shown in FIG. 17. It may be obtained from the manufacturing illustrated in the cross-section of FIG. 16 once the grooves in metal layer 74 have been formed, by application of the following steps:

depositing dielectric layer 52 (e.g. SiO, SiOxNy or the like), by preferably using standard BEOL materials and techniques of the CMOS manufacturing process;

defining openings 54, 56 in dielectric layer 52 to form electric contacts emerging onto metal 74. These contacts are typically formed along two opposite edges of the membrane, and define the two ends of main traducer material cuboid 44, deposited afterwards;

depositing second transducer material 44 of smaller resistivity, for example, and typically, a vanadium oxide (of generic formula VOx), or a nickel oxide (of generic formula NiOx), or a titanium oxide (of generic formula TiOx). Main transducer 44 is then insulated outside of openings 54, 56 of the electrode metal, to form the less resistive portion in parallel of resistor Rb in the plane of the transducer layers, delimited by the previously-formed contacts;

defining the contour of the second transducer material, for example, according to a simple rectangle, or more generally according to a simple polygon of smaller dimensions than the final surface area occupied by the membrane, and performing a dry or wet etching of said transducer, for example, selective over dielectric layer 52. Such an etching may not be particularly selective over dielectric layer 52, in which case it should be selective over metal layer 74, which provides a wide freedom of definition to those skilled in the art;

etching dielectric 52 (if it is still present at this stage according to the method implemented at the previous step), for example, and preferably (to advantageously use the same mask as the previous one) according to the same contour as the second transducer material, by means of a wet, or preferably dry, chemistry, selective over underlying metal 74. Such a preferential provision is intended to suppress dielectric 52 from the surface of the membrane arms, so that there only remain the two a-Si layers and the metallic material. A maximum thermal resistance (e.g. response) of the suspended membrane is thus obtained;

depositing a second encapsulation amorphous silicon layer 36 preferably (but not necessarily) with a resistivity and a thickness equivalent to those of base layer 34;

defining the membrane contour and the thermal insulation arms and etching all the layers in place, that is, the two a-Si layers 34, 36, and the metal of electrodes 20, 22. The perimeter of this mask preferably crosses in no location the pattern (the extension) of second transducer material 44, nor does it cross intermediate dielectric 52, to avoid locally exposing one or the other layer on the edge of the structure. Incidentally, such a provision eases the definition of the etch method.

Specific embodiments where the function of biasing of resistor Rb is implemented by two electrodes also implementing the absorption function have been described.

In a variation, the metal used for the electrodes and the metal used for the absorption may be formed from two different layers, particularly non-coplanar.

In a variation, the metal used for the electrodes and the absorption layer may be provided after the definition of the second transducer material, the biasing thereof (the electric continuity) being obtained from the upper interface.

The presently described embodiments are developed in the specifically relevant case of use as a first material, for the forming of the base layer and of the encapsulation layer, in other words of the tight layer, of amorphous silicon having a resistivity in the order of $10^2$ Ohm.cm. However, the use of amorphous material alloyed with germanium of a-Si$_x$Ge$_{(1-x)}$ type or with carbon of a-Si$_x$—C$_{(1-x)}$ type easily provides, according to the doping and the specific composition x, materials covering the range between typically 10 Ohm.cm et $10^4$ Ohm.om (beyond which said material can be considered in this specific context as almost "dielectric"), without departing from the context of the disclosure. Indeed, all these materials are inert to methods of etching sacrificial SiO layers in HFv form.

The invention claimed is:

1. A bolometric detection device comprising:
a substrate comprising a read-out circuit;
an array of elementary detectors each comprising a membrane suspended above the substrate and connected to the read-out integrated circuit by at least two electric conductors, said membrane comprising two electrically-conductive electrodes respectively connected to the two electric conductors, and a volume of transducer material electrically connecting the two electrodes,
wherein the read-out circuit is configured to apply an electrical stimulus between the two electrodes of the membrane and to form an electric signal as a response to said application,
wherein said volume comprises:
a volume of a first transducer material electrically connecting the two electrodes of the membrane and forming walls of a closed enclosure having each of the electrodes at least partially housed therein; and a volume of a second transducer material, electrically connecting the two electrodes and housed in the enclosure, the electric resistivity of the second material being smaller than the electric resistivity of the first material;

and wherein the two transducer materials have a negative thermal coefficient of resistivity TCR.

2. The bolometric detection device of claim 1, wherein the two electrodes are coplanar and only separated by one groove.

3. The bolometric detection device of claim 1, wherein the two electrodes belong to a series of at least three electrically-conductive coplanar areas, separated from one another by parallel grooves arranged between the two electrodes.

4. The bolometric detection device of claim 1, wherein the membrane comprises a continuous electric insulator layer extending between the electrodes and partially covering each of them.

5. The bolometric detection device of claim 1, wherein the electric resistivity of the second material is at least five times smaller than the electric resistivity of the first material and preferably from ten times to twenty times smaller.

6. The bolometric detection device of claim 1, wherein the first material has an electric resistivity greater than 10 Ohm.cm, and preferably a resistivity smaller than $10^4$ Ohm.cm.

7. The bolometric detection device of claim 1, wherein the first material is amorphous silicon, an amorphous alloy of silicon and germanium of formula $Si_xGe_{(1-x)}$, or an amorphous alloy of silicon and carbon of formula $a-Si_xC_{(1-x)}$, and the second material is a metal oxide.

8. A method of manufacturing a bolometric detection device, comprising:
manufacturing a substrate comprising a read-out circuit;
depositing a sacrificial layer on the substrate;
manufacturing, on the sacrificial layer, an array of membranes, each connected to the read-out circuit by at least two electric conductors, said membrane comprising two electrically-conductive electrodes respectively connected to the two electric conductors, and a volume of transducer material electrically connecting the two electrodes;
once the membranes have been manufactured, removing the sacrificial layer,
wherein the manufacturing of the transducer volume comprises:
depositing a lower layer of a first transducer material on the sacrificial layer;
forming, on said layer of the first material, the two membrane electrodes;
depositing on and between the electrodes a layer of second transducer; and
encapsulating the layer of second transducer material with an upper layer of the first material to also partially cover the two electrodes,
and wherein:
the two transducer materials have a negative thermal coefficient of resistivity TCR, and the electric resistivity of the second material is smaller than the electric resistivity of the first material;
the first material is inert to the removal of the sacrificial layer.

9. The bolometric detection device manufacturing method of claim 8, wherein the sacrificial layer is removed by a HFv hydrofluoric acid etching, and wherein the first material is amorphous silicon, an amorphous alloy of silicon and germanium of formula $a-Si_xGe_{(1-x)}$, or an amorphous alloy of silicon and carbon of formula $a-Si_xC_{(1-x)}$.

10. The bolometric detection device manufacturing method of claim 8, wherein the two electrodes are formed by depositing a layer of electrically-conductive material and by only forming one groove in said layer down to the lower layer of first material.

11. The bolometric detection device manufacturing method of claim 8, wherein the two electrodes are formed by depositing a layer of electrically-conductive material and by forming two parallel grooves in said layer down to the lower layer of first material.

12. The bolometric detection device manufacturing method of claim 8, wherein the electric resistivity of the second material is at least five times smaller than the electric resistivity of the first material and preferably from ten times to twenty times smaller.

13. The bolometric detection device manufacturing method of claim 8, wherein the first material has an electric resistivity greater than 10 Ohm.cm, and preferably a resistivity smaller than $10^4$ Ohm·cm.

14. The bolometric detection device manufacturing method of claim 8, wherein said method comprises, before depositing the second transducer material, depositing an electrically-insulating layer extending between the electrodes and partially covering each of them.

* * * * *